United States Patent
Subramanian et al.

(10) Patent No.: US 8,285,993 B1
(45) Date of Patent: *Oct. 9, 2012

(54) SYSTEM AND METHOD FOR ESTABLISHING A SHARED SECRET AMONG NODES OF A SECURITY APPLIANCE

(75) Inventors: Ananthan Subramanian, Menlo Park, CA (US); Robert Jan Sussland, San Francisco, CA (US); Lawrence Wen-Hao Chang, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,371

(22) Filed: Apr. 22, 2011

Related U.S. Application Data

(63) Continuation of application No. 11/540,441, filed on Sep. 29, 2006, now Pat. No. 7,958,356.

(51) Int. Cl.
*H04L 29/06* (2006.01)

(52) U.S. Cl. ........ 713/171; 713/150; 713/162; 713/163; 713/168; 713/181; 713/182; 380/229; 380/28; 380/30; 380/277; 380/278; 380/282; 709/223; 709/224; 709/225

(58) Field of Classification Search .................. None
See application file for complete search history.

(56) References Cited

U.S. PATENT DOCUMENTS

| | | | | |
|---|---|---|---|---|
| 7,139,917 B2 * | 11/2006 | Jablon | ......................... | 713/183 |
| 7,409,545 B2 * | 8/2008 | Perlman | ...................... | 713/164 |
| 7,545,932 B2 * | 6/2009 | Durand et al. | .................. | 380/44 |
| 7,580,521 B1 * | 8/2009 | Spies et al. | ....................... | 380/44 |
| 7,761,910 B2 * | 7/2010 | Ransom et al. | ................... | 726/6 |
| 7,779,259 B2 * | 8/2010 | Vanstone et al. | ................ | 713/169 |
| 7,861,097 B2 * | 12/2010 | Smeets et al. | ................ | 713/194 |
| 7,908,482 B2 * | 3/2011 | Lauter et al. | ................. | 713/171 |
| 7,921,290 B2 * | 4/2011 | Albert et al. | .................. | 713/168 |
| 7,953,227 B2 * | 5/2011 | Meier et al. | ................... | 380/277 |
| 7,958,356 B1 * | 6/2011 | Subramanian et al. | ........ | 713/171 |
| 8,064,597 B2 * | 11/2011 | Gehrmann | ..................... | 380/247 |
| 2002/0136410 A1 * | 9/2002 | Hanna | ............................ | 380/277 |
| 2002/0191797 A1 * | 12/2002 | Perlman | ....................... | 380/281 |
| 2003/0217258 A1 * | 11/2003 | Bade | ............................... | 713/150 |
| 2004/0153642 A1 | 8/2004 | Plotkin et al. | | |
| 2005/0002531 A1 * | 1/2005 | Michaelsen | .................. | 380/268 |
| 2005/0100166 A1 * | 5/2005 | Smetters et al. | ............. | 380/277 |
| 2008/0195866 A1 * | 8/2008 | Roth et al. | ..................... | 713/171 |
| 2009/0063863 A1 * | 3/2009 | Durand et al. | ................ | 713/171 |
| 2009/0144557 A1 * | 6/2009 | Sutton | ........................... | 713/189 |

OTHER PUBLICATIONS

Kaufman, Charlie, et al., Network Security: PRIVATE Communication in a PUBLIC WORLD; pp. 147-152, Prentice Hall PTR, Upper Saddle River, New Jersey 07458, 1995.

* cited by examiner

*Primary Examiner* — Syed A. Zia
(74) *Attorney, Agent, or Firm* — Cesari and McKenna, LLP

(57) ABSTRACT

A method for distributing a shared secret key among a plurality of nodes is described. Each node establishes a secret key, the number of nodes being more than two nodes. A node distributes by a ring protocol executing over computer network connections an encrypted version of the secret key of each node to other nodes of the plurality of nodes. Each node decrypts the secret keys of other nodes so that each node has the secret key of other nodes. Each node combines the secret keys of other nodes to form a shared secret key available to other nodes.

14 Claims, 6 Drawing Sheets

SYSTEM AND METHOD FOR ESTABLISHING A SHARED SECRET AMONG NODES OF A SECURITY APPLIANCE

CROSS-REFERENCE TO RELATED APPLICATION

The present invention is a continuation of U.S. patent application Ser. No. 11/540,441, filed on Sep. 29, 2006, now issued as U.S. Pat. No. 7,958,356, issued on Jun. 7, 2011, entitled System and Method for Establishing a Shared Secret Among Nodes of a Security Appliance, by Subramanian et al. The present invention is also related to the following commonly assigned U.S. patent application Ser. No. 10/478,386 entitled, Encryption Based Security System for Network Storage, filed May 14, 2003, which application is hereby incorporated by reference.

FIELD OF THE INVENTION

The present invention relates to security appliances and, more specifically, to a technique for securely establishing a shared secret among nodes of a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file is mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients into encrypted data (ciphertext) destined for secure storage or "cryptainers" on the storage system. As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Often, the security appliance is configured with a plurality of nodes, e.g., processors, each of which is configured to perform encryption and decryption operations for the security appliance. Each node typically has no knowledge of the other nodes within the security appliance; however, the nodes may be required to share a secret. Accordingly, a technique is needed to securely enable each node to a share a secret. In addition, a technique is needed to securely introduce the shared secret to each node of the security appliance.

SUMMARY OF THE INVENTION

The disadvantages of the prior art are overcome by providing a system and method for securely establishing a shared secret among nodes of a security appliance. The shared secret is established by distributing private keys among the nodes in accordance with a node ring protocol that uses a predetermined encryption algorithm to generate messages containing only public information about the keys. Briefly, each node is initially notified as to the number of nodes participating in the shared secret establishment. Each node generates a public private key pair, as well as a first message that includes the private key of the generated key pair and an indication of the source of the generated private key (hereinafter "source generated private key"). The node then sends the first message to an adjacent node of the appliance. Upon receiving the first message, each node extracts the source generated private key from the message and locally stores the extracted information, e.g., in a data structure of "partner" keys.

Each node then combines its own private key with the public information received from the first message and generates a second message that includes the source generated private key combination. The node sends the second message to its adjacent node of the appliance, which extracts the key combination and locally stores the added source generated private key of the combination. The protocol then continues with each node generating additional messages equal to the number of participating nodes minus one, wherein each additional message combines the local private key of each node with the additional public information keys received from the additional messages. As the final step, each node combines its own private key with the stored partner information and private key combinations to generate a value that is common among all of the participating nodes. This common value is then used to derive the shared secret.

BRIEF DESCRIPTION OF THE DRAWINGS is The above and further advantages of the invention may be better understood by referring to the following description in conjunction with the accompanying drawings in which like reference numerals indicate identical or functionally similar elements:

FIGS. 4A-E are schematic diagrams illustrating a node ring protocol in accordance with the present invention.

DETAILED DESCRIPTION OF AN ILLUSTRATIVE EMBODIMENT

Figure 1:
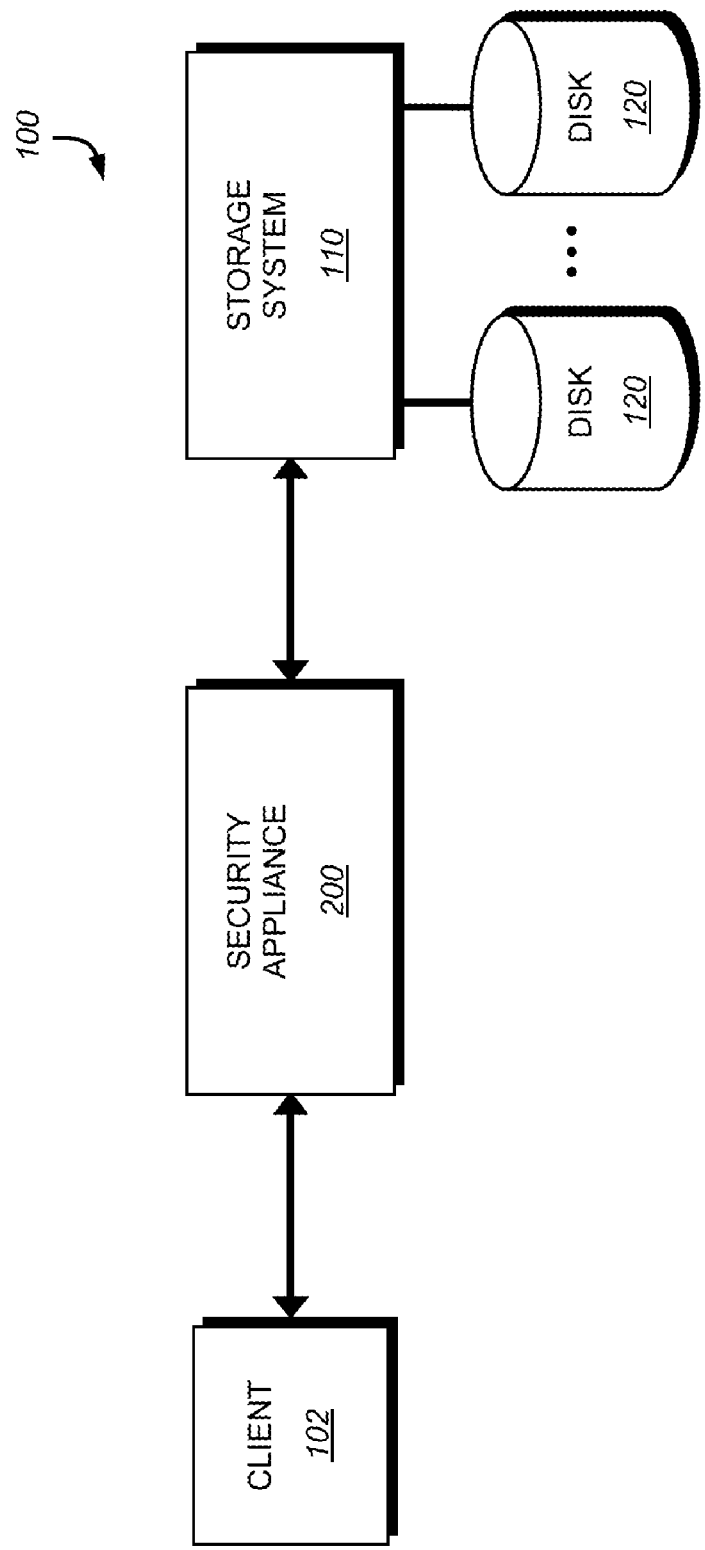
FIG. 1 is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security is appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Figure 2:
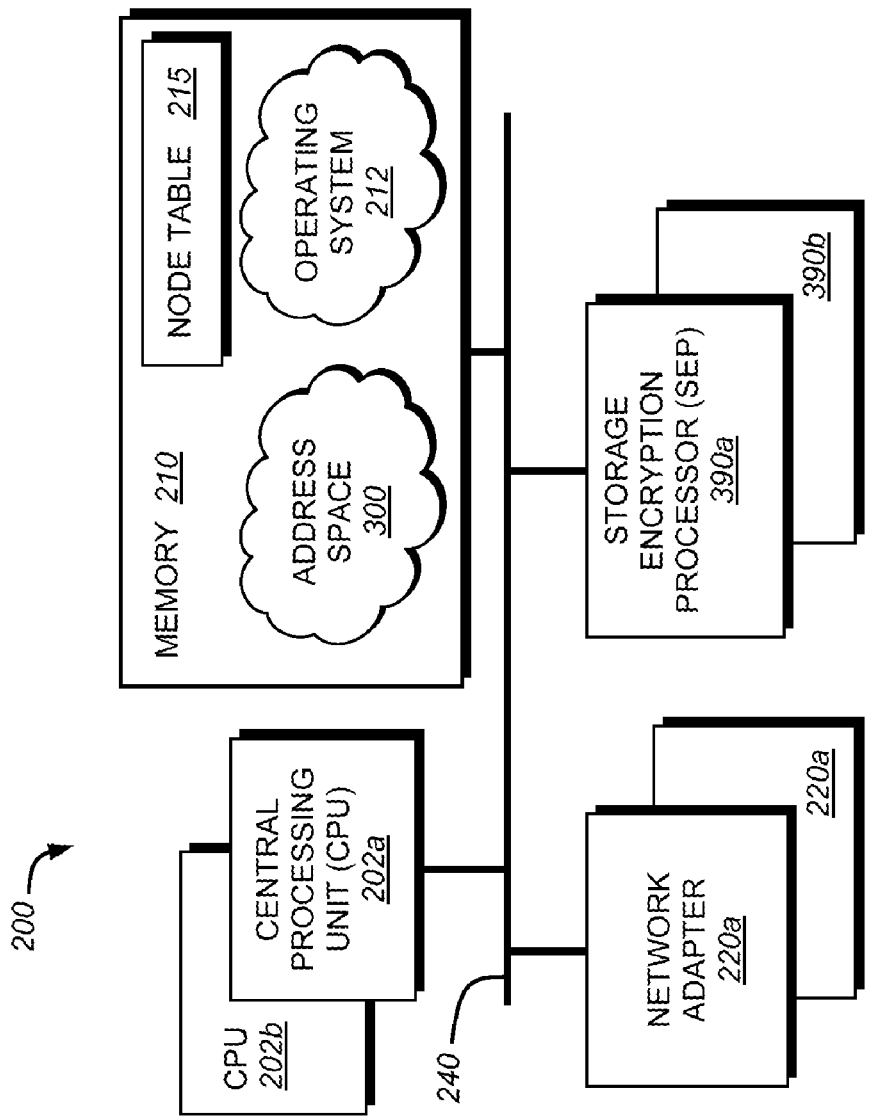
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, and one or more storage encryption processors (SEP 390,b) interconnected by a system bus 240, such as a conventional Peripheral Component Interconnect (PCI) bus. The PCI bus implements conventional bus arbitration and contention management functionality among the plurality of SEPs 390. Each SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures, such as node table, associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
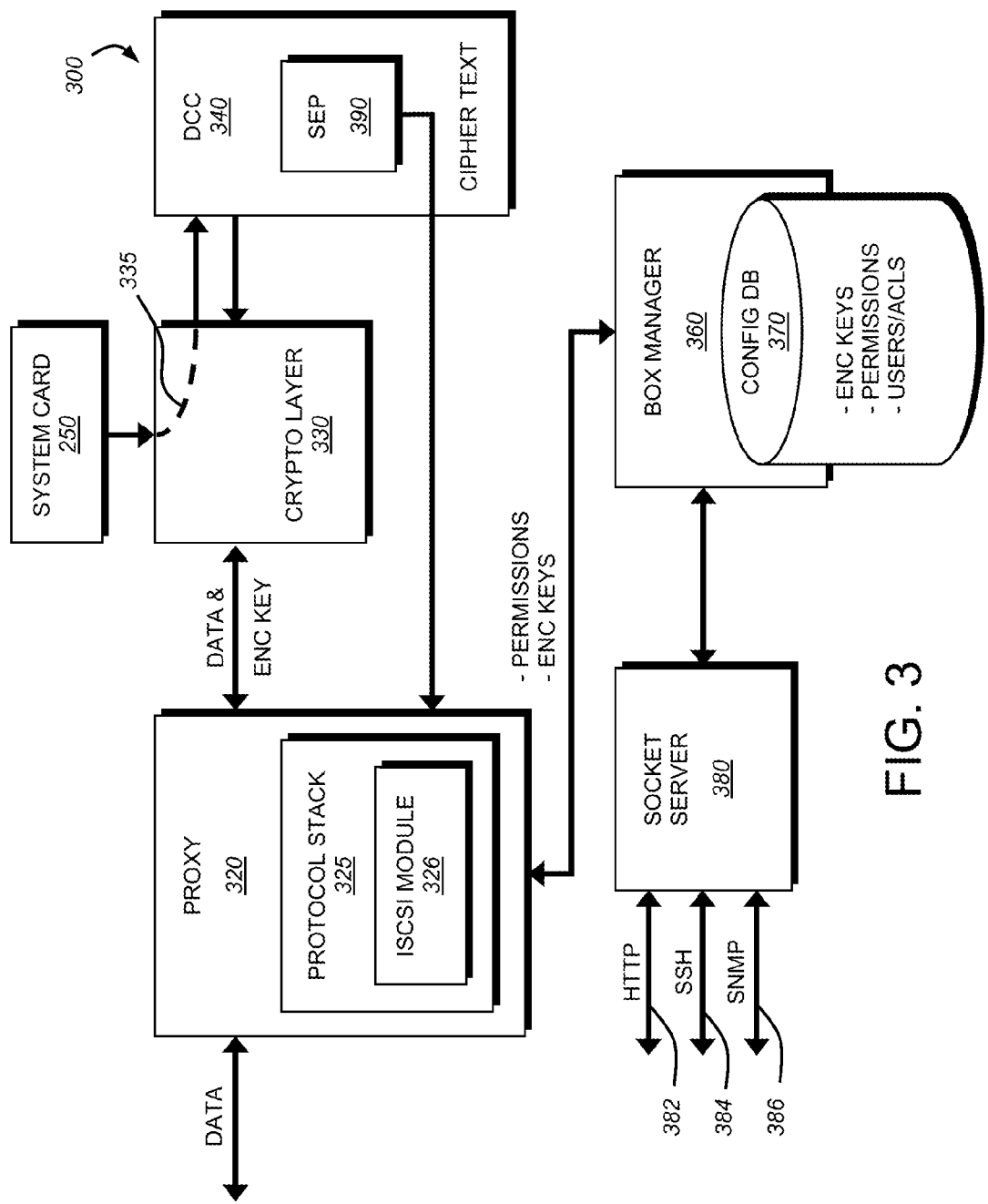
FIG. 3 is a schematic diagram illustrating an arrangement of software processes and modules executing on the security appliance in accordance with the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., the network protocol stack configured to interpret the protocol over which data is received and to enforce certain access control rules based on one or more policies. Each policy is served by a box manager 360 that is illustratively embodied as a database application process configured to manage a configuration repository or database (Config DB 370) that stores permissions, access control lists (ACLs), system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. As noted, the SEP resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, is the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain of the customizations to the network protocol stack of the proxy 320 involve virtualization optimizations provided by the appliance. For example, the security appliance 200 manipulates (changes) the source and destination IP addresses of the data access requests and responses.

As noted, the security appliance may be configured with a plurality of SEPs or nodes, each of which has no knowledge of the other nodes. However, each node may be required to share a secret, such as a key encrypting key, with the other nodes of the security appliance. Moreover, it is desirable that the nodes establish and share the secret in a secure manner.

The present invention is directed to a system and method for securely establishing a shared secret among nodes of a security appliance. The shared secret is established by distributing ephemeral, i.e., transitory and short lived, public information among the nodes in accordance with a node ring protocol that uses a predetermined encryption algorithm to generate messages containing public information about the keys. It should be noted that topologies other than node rings may be utilized in accordance with alternate embodiments of the present invention. Briefly, each node is initially notified as to the number of nodes participating in the shared secret establishment. Each node generates an ephemeral public private key pair, as well as a first message that includes the generated private key and an indication of the source of message (hereinafter "source generated private key"). The node then sends the first message to an adjacent node of the appliance. Upon receiving the first message, each node extracts the source ID and generated private key from the message and locally stores the extracted information, e.g., in a data structure of private "partner" keys.

Each node then combines its private key with the ephemeral public information received from the first message and generates a second message that includes this new source generated private key combination. The node sends the second message to its adjacent node of the appliance, which extracts the key combination and locally stores the added source generated private key of the combination. The protocol then continues with each node generating additional messages equal to the number of participating nodes minus one, wherein each additional message includes the source generated public information for each node combined with additional pubic information received from the additional messages. As the final step, each node combines its private key with its locally stored ephemeral partner public information to generate a value that is common among all of the participating nodes. This common value is then used to derive the shared secret.

FIGS. 4A-E are schematic diagrams illustrating the node ring protocol in accordance with the present invention. In the illustrative embodiment, the security appliance contains a plurality of (four) nodes, wherein each node is a SEP, e.g., $SEPs_{1-4}$. Distribution of the private keys among the SEPs is performed in a secure Federal Information Processing Standard (FIPS)-certified manner and, to that end, the node ring protocol is illustratively a generalized version of the conventional Diffie-Hellman (DH) public key algorithm. The DH algorithm is well-known and disclosed in *Network Security, Private Communication in a Public World*, by C. Kaufman et al., Prentice Hall PTR, (1995) at pgs 147-152, which disclosure is hereby incorporated by reference.

Figure 4A:
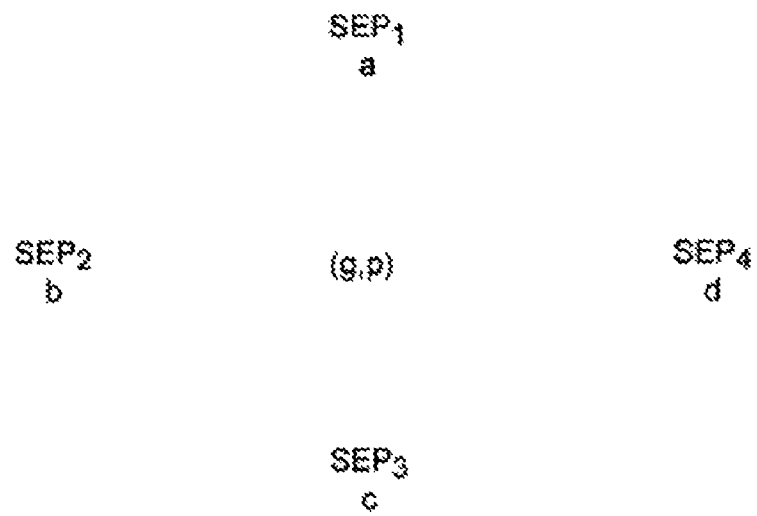
Figure 4B:
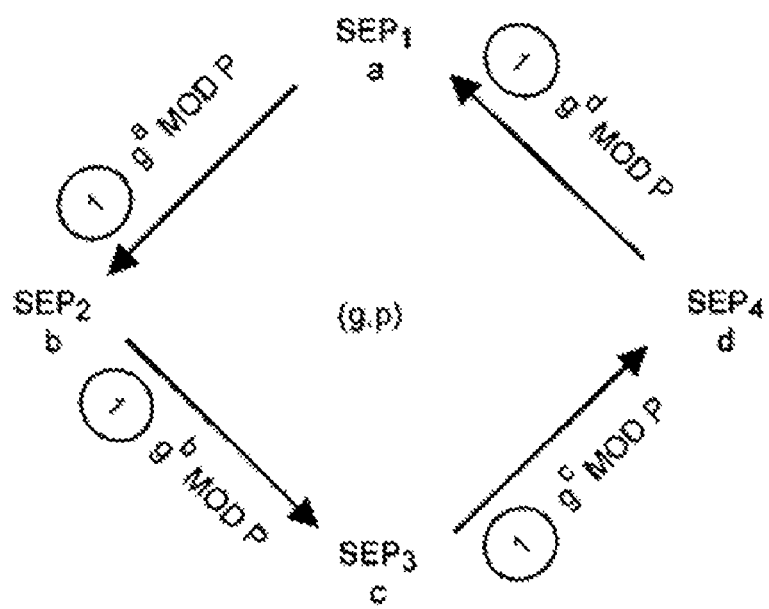

Referring to FIG. 4A, the messages generated in accordance with the node protocol use a DH group of numbers p and g, wherein p is a prime and g is a number less than p. Each SEP generates a random secret (private key), such that $SEP_1$ generates private key a, $SEP_2$ generates private key b, $SEP_3$ generates private key c, and $SEP_4$ generates private key d. In FIG. 4B, each SEP uses the DH group to generate a first message that includes its private key and an indication of the source of that key (hereinafter "source generated key"). Illustratively, the message embodies the form of $g^X$ mod p, wherein X is the source generated key (or source generated key combination).

The SEP then sends (transmits) the first message to an adjacent SEP of the appliance. For example, $SEP_1$ generates and transmits a first message $g^a$ mod p to $SEP_2$, which generates and transmits a first message $g^b$ mod p to $SEP_3$. Note that the generation and transmission of first (and subsequent) messages among the SEPs may occur substantially in parallel, although this is not a requirement of the invention. Upon receiving the first message, each node extracts the source generated key from the message and locally stores the extracted key information. That is, for instance, $SEP_2$ extracts $SEP_1$'s private key a and locally stores that key, e.g., in a data structure of private "partner" keys. In the illustrative embodiment, the data structure is embodied as node table 215.

Figure 4C:
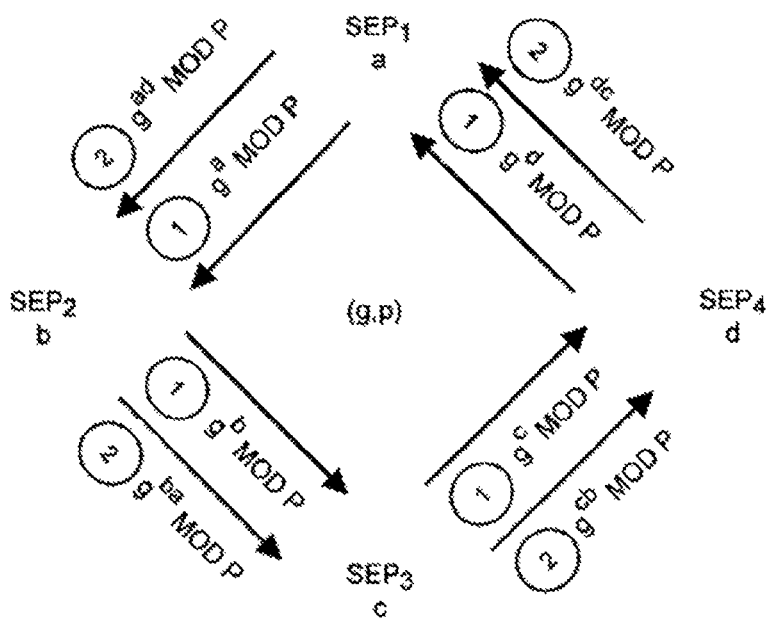
Figure 4D:
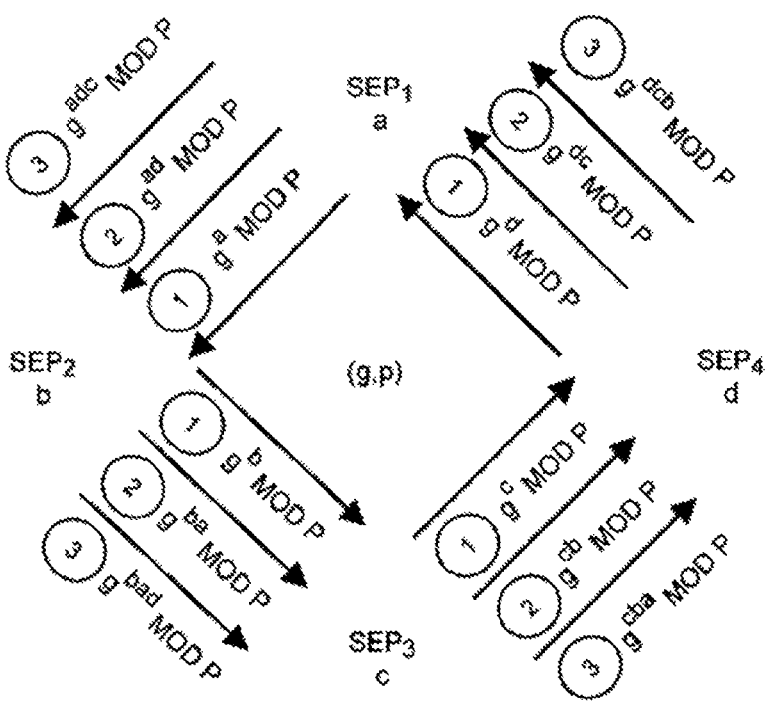

In FIG. 4C, each SEP combines its own private key with the partner key received from the first message and generates a second message that includes the source generated key combination. For example, $SEP_3$ generates and transmits a second message $g^{cb}$ mod p to $SEP_4$, which generates and transmits a second message $g^{dc}$ mod p to $SEP_1$. Upon receiving the second message, each node extracts the key combination and locally stores the added source generated key of the combination. For instance, $SEP_4$ extracts and locally stores the added source generated key b (i.e., the private key generated by $SEP_2$). In FIG. 4D, each SEP combines its private key with the partner keys received from the first and second messages, and generates a third message that includes the source generated key combination. For example, $SEP_2$ generates and transmits a third message $g^{bad}$ mod p to $SEP_3$, which generates and transmits a third message $g^{cba}$ mod p to $SEP_4$. Upon receiving the third message, each node extracts the added source generated key from the message and locally stores the extracted key information.

Figure 4E:
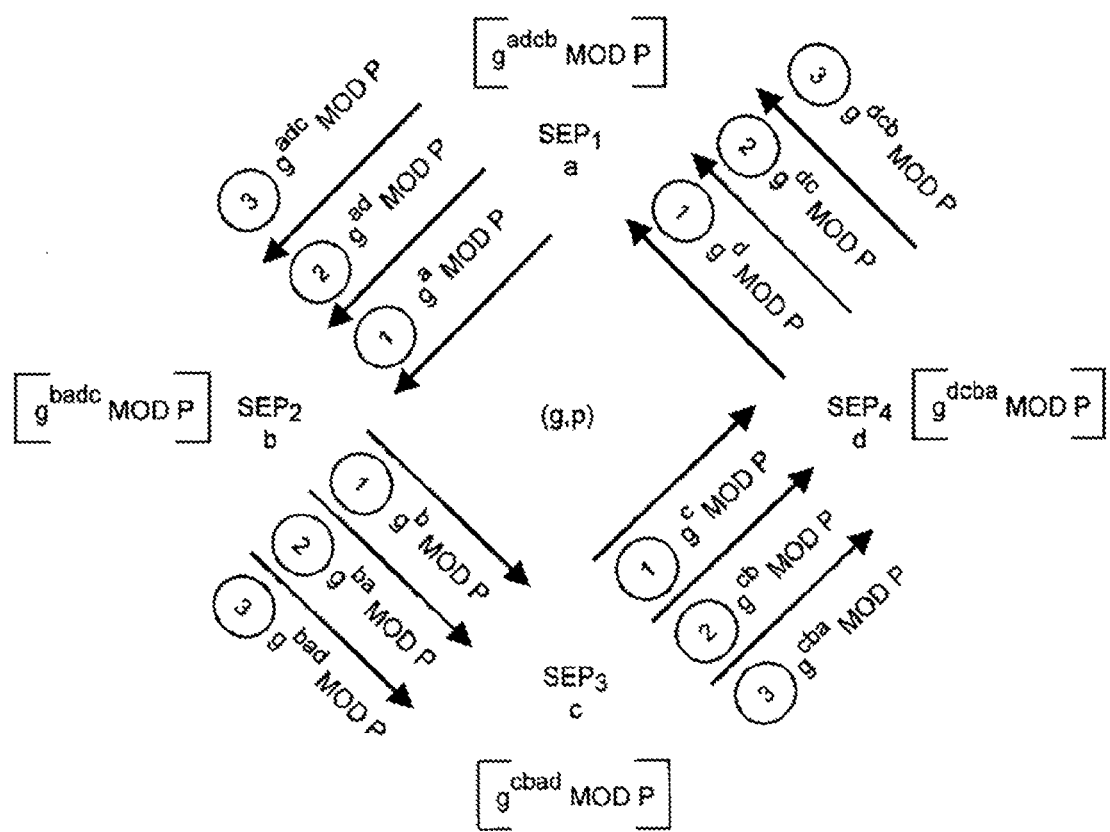

In FIG. 4E, each SEP then combines its private key with the partner information received from the first, second and third messages to generate a value that is common among all of the participating SEPs. Notably, this common value comprises the exponent of the quantity g. For example, $SEP_1$ combines its private key with the partner keys to generate $g^{adcb}$ mod p, $SEP_2$ combines its private key with the partner keys to generate $g^{badc}$ mod p, $SEP_3$ combines its private key with the partner keys to generate $g^{cbad}$ mod p, and $SEP_4$ combines its private key with the partner keys to generate $g^{dcba}$ mod p. According to exponent arithmetic, the order of exponents do not matter, e.g., $g^{adcb}=g^{badc}=g^{cbad}=g^{dcba}$. According to the invention, this common value is then used to derive the shared secret.

Advantageously, the novel node ring protocol provides a method for securely establishing a shared secret among SEPs of the security appliance. In the illustrative embodiment described herein, the shared secret may be used by the SEPs as a key encrypting key to facilitate sharing of other keys among the SEPs. That is, the novel protocol ensures that each SEP can derive the same ignition key $IG_1$ without knowing the shared secret beforehand. Moreover, the exchange of messages as defined by the node ring protocol occurs in a secure manner that does not compromise the integrity of the resulting common value. In other words, even if an attacker intercepts all of the messages exchanged among the SEPs participating in the shared secret establishment, the attacker would not have enough information to be able to derive the common value as the private parts are ephemeral and are cleared at the completion of the process.

While there has been shown and described an illustrative embodiment of a system and method for securely establishing a shared secret among nodes of a security appliance, it is to be understood that various other adaptations and modifications may be made within the spirit and scope of the invention. For example, in an alternate embodiment, the node ring protocol may be used to establish an authentication key as well as a shared ignition key. That is, in addition to establishing ignition key $IG_1$ used for encryption (of master key MK), the protocol may be used to establish an authentication key used for communication among any pairs of the participating SEPs. For example, if two SEPs decide to change the common value used to derive the ignition key $IG_1$, the SEPs may establish a secure channel using the authentication key, and one of the SEPs may generate a new random secret value and send that value over the channel to the other SEP.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for establishing a shared secret key among a plurality of nodes, each having a processor, interconnected by a computer network, comprising:

generating by each node of the plurality of nodes a source generated private key, each node of the plurality of nodes having knowledge of a number of nodes in the plurality of nodes, the number of nodes being more than two nodes, and wherein the total number of nodes is N;

distributing by the node an initial message including information associated with the source generated private key to an adjacent node of the plurality of nodes;

extracting, by the adjacent node, the source generated private key from the initial message;

distributing, by the node, N−1 additional messages to the adjacent node, wherein each additional message includes at least different information associated with a different source generated private key;

extracting, by the adjacent node, each different source generated private key from each additional message; and combining, by the adjacent node, the source generated private key extracted from the initial message, each of the different source generated private keys extracted from each additional message, and the adjacent node's generated private key to form the shared secret key.

2. The method as in claim 1, further comprising:

storing the private key of each node in a data structure in each node.

3. The method as in claim 1, further comprising:

establishing a node ring by the plurality of nodes; and knowing the adjacent node of the node ring by each node of the node ring.

4. The method as in claim 1, further comprising:

generating the private key by each node of the plurality of nodes, and having an identifier of each node.

5. The method as in claim 1, further comprising:

storing, by the adjacent node, the private key in a partner key data structure.

6. The method as in claim 1, further comprising:

combining, by the adjacent node, the private key extracted from the initial message with adjacent node information associated with the adjacent node's private key to create a combination; and sending the combination to another adjacent node that is adjacent to the adjacent node.

7. The method as in claim 6, further comprising:

combining, by the another adjacent node, the combination with another adjacent node information associated with the another adjacent node's private key to create a second combination;

sending the second combination to a different adjacent node that is adjacent to the another adjacent node.

8. An apparatus having a plurality of nodes interconnected by a computer network to establish a shared secret key among the plurality of nodes each having a processor, comprising:

each node of the plurality of nodes to have a private key, each node of the plurality of nodes having knowledge of a number of nodes in the plurality of nodes, the number of nodes being more than two nodes and equal to N;

computer network connections of the computer network configured to enable each node of the plurality of nodes to distribute an initial message including information associated with its private key to an adjacent node, and wherein each node sends N-1 additional messages to the adjacent node, and wherein each additional message includes different information associated with a different private key; and the adjacent node configured to extract the private key from the initial message, extract each different private key associated with each additional message, and combine the private key, each of the different private keys, and the adjacent node's private key to form the shared secret key.

9. The apparatus as in claim 8, further comprising:

a data structure in each node to store the private key.

10. The apparatus as in claim 8, further comprising:

a node ring established by the plurality of nodes; and the adjacent node to be known by each node of the node ring.

11. The apparatus as in claim 8, further comprising:

the private key generated by each node of the plurality of nodes, and having an identifier of each node.

12. The apparatus as in claim 8, further comprising:

the adjacent node configured to combine the private key extracted from the initial message with adjacent node information associated with the adjacent node's private key to create a combination;

the adjacent node to send the combination to another adjacent node that is adjacent to the adjacent node.

13. The method as in claim 12, further comprising:

the another adjacent node to combine the combination with the another adjacent node information associated with the another adjacent node's private key to create a second combination; and the another adjacent node to send the second combination to a different adjacent node that is adjacent to the another adjacent node.

14. A non-transitory computer readable medium containing executable program instructions executed by a processor, comprising:

program instructions that generate for each node of a plurality of nodes a private key, each node of the plurality of nodes having knowledge of a number of nodes in the plurality of nodes, the number of nodes being more than two nodes, and wherein the total number of nodes is N;

program instructions that distribute an initial message including information associated with the private key to an adjacent node of plurality of nodes;

program instructions that extract the private key from the initial message;

program instructions that distribute N-1 additional messages to the adjacent node, wherein each additional message includes at least different information associated with a different private key;

program instructions that extract each different private key from each additional message; and program instructions that combine the private key extracted from the initial message, each of the different private keys extracted from each additional message, and the adjacent node's generated private key to form a shared secret key available to the other nodes.

\* \* \* \* \*

UNITED STATES PATENT AND TRADEMARK OFFICE
CERTIFICATE OF CORRECTION

PATENT NO. : 8,285,993 B1  Page 1 of 1
APPLICATION NO. : 13/092371
DATED : October 9, 2012
INVENTOR(S) : Ananthan Subramanian et al.

It is certified that error appears in the above-identified patent and that said Letters Patent is hereby corrected as shown below:

Col. 2, line 33 should read: "client requesting the information maintains file is mappings"

Col. 3, line 46 should read: "is The above and further advantages of the invention may"

Col. 6, line 8 should read: "is the DCC returns the encrypted data as ciphertext to the"

Col. 9, line 45 should read: "associated with its private key to an adjacent node, and"

Signed and Sealed this
Fourth Day of December, 2012

David J. Kappos
*Director of the United States Patent and Trademark Office*